United States Patent
Bellinger et al.

(10) Patent No.: US 7,171,292 B2
(45) Date of Patent: Jan. 30, 2007

(54) VEHICLE POWERTRAIN TORSIONAL PROCESSING SYSTEM

(75) Inventors: Steven M. Bellinger, Columbus, IN (US); David M. Carey, Lino Lakes, MN (US)

(73) Assignee: Cummins, Inc., Columbus, IN (US)

( * ) Notice: Subject to any disclaimer, the term of this patent is extended or adjusted under 35 U.S.C. 154(b) by 492 days.

(21) Appl. No.: 10/806,716

(22) Filed: Mar. 23, 2004

(65) Prior Publication Data

US 2005/0216145 A1   Sep. 29, 2005

(51) Int. Cl.
*G01M 17/00* (2006.01)

(52) U.S. Cl. .................... 701/29; 701/31; 701/111

(58) Field of Classification Search ............ 701/1, 701/29, 31, 32, 33, 34, 35, 36, 51, 54, 99, 701/101, 111; 340/10.1, 10.52, 825.69
See application file for complete search history.

(56) References Cited

U.S. PATENT DOCUMENTS

| | | | |
|---|---|---|---|
| 4,663,981 A | 5/1987 | Louradour et al. | |
| 4,843,870 A | 7/1989 | Citron et al. | |
| 4,893,600 A | 1/1990 | Holmes | |
| 5,341,780 A | 8/1994 | Rau et al. | |
| 5,448,976 A | 9/1995 | Treinies et al. | |
| 5,596,496 A | 1/1997 | Loeffler | |
| 5,726,353 A | 3/1998 | Matsuda et al. | |
| 6,021,758 A | 2/2000 | Carey et al. | |
| 6,850,824 B2 * | 2/2005 | Breed | 701/36 |
| 6,991,585 B2 * | 1/2006 | Colvin et al. | 477/174 |
| 7,082,359 B2 * | 7/2006 | Breed | 701/36 |
| 7,089,099 B2 * | 8/2006 | Shostak et al. | 701/32 |
| 7,103,460 B1 * | 9/2006 | Breed | 701/29 |

* cited by examiner

Primary Examiner—Richard M. Camby
(74) Attorney, Agent, or Firm—Barnes & Thornburg LLP

(57) ABSTRACT

A system is disclosed for processing vehicle powertrain torsional information resulting from vibration of the vehicle powertrain. A speed sensor produces a speed signal indicative of rotational speed of one of the powertrain components, and a control computer is operable to determine a magnitude of an Nth-order torsional component of vehicle powertrain vibration as a function of the speed signal. The control computer is further operable to execute either of a diagnostic routine relating to the Nth-order torsional component and a control routine controlling operation of the vehicle powertrain away from conditions at which the magnitude of the Nth-order torsional component exceeds a threshold magnitude if the magnitude of the Nth-order torsional component exceeds the threshold magnitude for at least a first predefined duration.

28 Claims, 9 Drawing Sheets

VEHICLE POWERTRAIN TORSIONAL PROCESSING SYSTEM

FIELD OF THE INVENTION

The present invention relates generally to techniques for detecting and processing vehicle powertrain torsional information, and more specifically to techniques for monitoring any one or more Nth-order powertrain torsionals, and providing diagnostic information and/or controlling one or more engine/vehicle operational parameters as a function thereof.

BACKGROUND OF THE INVENTION

Vehicle powertrain torsionals, i.e., Nth-order components of vehicle powertrain vibrations, may, under some operating conditions, achieve undesirably high magnitudes, and the occurrence of such high magnitude torsionals over an extended duration may result in potential vehicle powertrain or drivetrain damage. It is desirable to diagnose and/or control such torsionals to determine the frequency of their occurrence and/or to control powertrain operation away from conditions at which they occur.

SUMMARY OF THE INVENTION

The present invention may comprise one or more of the following features and combinations thereof. A system for processing vehicle powertrain torsional information may comprise a vehicle powertrain having a plurality of powertrain components including an internal combustion engine and a number of downstream components driven by the engine. A speed sensor produces a speed signal indicative of rotational speed of one of the powertrain components, and a control computer determines a magnitude of an Nth-order torsional component of vehicle powertrain vibration as a function of the speed signal. The control computer further executes either of a diagnostic routine relating to the Nth-order torsional component and a control routine controlling operation of the vehicle powertrain away from conditions at which the magnitude of the Nth-order torsional component exceeds a threshold magnitude if the magnitude of the Nth-order torsional component exceeds the threshold magnitude for at least a first predefined duration.

The system may further include a fault lamp illuminating in response to a control signal, wherein the control computer may be operable under control of the diagnostic routine to produce the control signal to illuminate the fault lamp.

The system may further include a memory unit, wherein the control computer may be operable under control of the diagnostic routine to log in the memory unit an elapsed time that the magnitude of the Nth-order torsional component exceeds the threshold magnitude.

The control computer may be configured to control output torque of the engine by controlling fuel supplied to the engine, and may further be operable under control of the control routine to modify the output torque of the engine such that the resulting magnitude of the Nth-order torsional component is below the threshold magnitude. The control computer may further be operable to delay for a second predefined duration after modifying the engine output torque and before determining the resulting magnitude of the Nth-order torsional component.

The plurality of powertrain components may include a transmission operatively coupled to the engine and having a number of automatically selectable gears, and the control computer may be operable under control of the control routine to command an automatic transmission gear shift such that the resulting magnitude of the Nth-order torsional component is below the threshold magnitude. The control computer may further be operable to delay for a second predefined duration after commanding the automatic transmission gear shift and before determining the resulting magnitude of the Nth-order torsional component.

In some embodiments, the speed sensor may be an engine speed sensor producing the speed signal as a function of engine rotational speed. The engine includes a crankshaft rotatably driven by operation of the engine, and the speed sensor may in other embodiments be operatively coupled to one of the plurality of powertrain components. As one example, the plurality of powertrain components may include a change gear transmission operatively coupled to the engine and driven by the crankshaft, and a tailshaft operatively coupled to, and driven by, the transmission, wherein the speed sensor may be a tailshaft speed sensor producing the speed signal indicative of rotational speed of the tailshaft.

The control computer may be an engine control computer configured to control and manage overall operation of the engine. The plurality of powertrain components may include a transmission operatively coupled to the engine and having a number of automatically selectable gears, and the control computer may alternatively be a transmission control computer configured to control and manage overall operation of the transmission. In either case, a communication link may be established between the transmission control computer and the engine control computer to allow communication of information therebetween.

The control computer may include a timer, and the first predefined duration may correspond to an elapsed time value of the timer between a first occurrence of the magnitude of the Nth-order torsional component exceeding the threshold magnitude and a predefined elapsed time value. Alternatively or additionally, the engine speed sensor may be further configured to produce an engine position signal indicative of a position of a crankshaft of the engine relative to a reference position, and the first predefined duration may correspond to a predefined number of revolutions of the crankshaft of the engine, wherein the control computer is operable to monitor the engine position signal to determine the first predefined duration. Alternatively or additionally, the first predefined duration may correspond to a predefined number of consecutive occurrences of the magnitude of the Nth-order torsional component exceeding the threshold magnitude, wherein the control computer is operable to monitor the magnitude of the Nth-order torsional component to determine the first predefined duration.

In one specific implementation of the concepts described herein, the plurality of powertrain components may include a vibration damper coupled to a crankshaft of the engine, wherein the vibration damper is operable to damp vibrations resulting from rotation of the crankshaft. The Nth-order torsional component, in this embodiment, may correspond to a $6^{th}$-order torsional component, and the magnitude of the $6^{th}$-order torsional component exceeding the threshold magnitude for the first predefined duration while operating the engine within a predefined engine speed range may result in an increase in an operating temperature of the vibration temperature above a safe operating temperature limit.

In another specific implementation of the concepts described herein, the plurality of powertrain components may include a change gear transmission operatively coupled to the engine, a tailshaft having a first end operatively coupled to the transmission and an opposite second end, and a differential having a universal joint operatively connected to the second end of the tailshaft, wherein the connection between the universal joint and the tailshaft defines an angular relationship therebetween having an allowable angular range. The Nth-order torsional component, in this case, may correspond to a $2^{nd}$-order torsional component, and the magnitude of the $2^{nd}$-order torsional component exceeding the threshold magnitude for the first predefined duration may be indicative of the angular relationship between the universal joint and the tailshaft being outside of the allowable angular range.

A method of processing torsional information relating to operation of a vehicle powertrain having a plurality of powertrain components including an internal combustion engine and a number of downstream components driven by the engine, and having a speed sensor producing a speed signal indicative of rotational speed of one of the powertrain components, may comprise the steps of processing the speed signal to determine a magnitude of an Nth-order torsional component of vehicle powertrain vibration, and executing either of a diagnostic routine relating to the Nth-order torsional component and a control routine controlling operation of the vehicle powertrain away from conditions at which the magnitude of the Nth-order torsional component exceeds a threshold magnitude if the magnitude of the Nth-order torsional component exceeds the threshold magnitude for at least a predefined duration.

The diagnostic routine of the executing step may include illuminating a fault lamp under control of the diagnostic routine. Alternatively or additionally, the diagnostic routine of the executing step may include logging in memory an elapsed time that the magnitude of the Nth-order torsional component exceeds the threshold magnitude.

The control routine of the executing step may include modifying engine output torque such that the resulting magnitude of the Nth-order torsional component is below the threshold magnitude. Alternatively or additionally, the control routine of the executing step may include commanding an automatic gear shift of a transmission operatively coupled to the engine such that the resulting magnitude of the Nth-order torsional component is below the threshold magnitude.

A system for processing vehicle powertrain torsional information may comprise a vehicle powertrain having a plurality of powertrain components including an internal combustion engine and a number of downstream components driven by the engine. A speed sensor may produce a speed signal indicative of rotational speed of one of the powertrain components, and a control computer may be configured to control engine fueling and to determine an engine load value as a function of the engine fueling. The control computer may further be operable to determine whether the engine speed signal and engine load value are within a speed-load region in which a magnitude of an Nth-order torsional component of vehicle powertrain vibration exceeds a threshold magnitude, and to execute either of a diagnostic routine relating to the Nth-order torsional component and a control routine controlling operation of the vehicle powertrain away from the speed-load region if the engine speed signal and engine load value are within the speed-load region for at least a predefined duration.

The system may further include a fault lamp illuminating in response to a control signal, and the control computer may be operable under control of the diagnostic routine to produce the control signal to illuminate the fault lamp.

The system may further include a memory unit, and the control computer may be operable under control of the diagnostic routine to log in the memory unit an elapsed time that the engine speed signal and engine load value are within the speed-load region.

The control computer may be configured to control output torque of the engine, and the control computer may be operable under control of the control routine to modify the output torque of the engine to move engine operating conditions away from of the speed-load region.

The plurality of powertrain components may include a transmission operatively coupled to the engine and having a number of automatically selectable gears, and the control computer may be operable under control of the control routine to command an automatic transmission gear shift to move engine operating conditions away from of the speed-load region.

These and other features of the present invention will become more apparent from the following description of the illustrative embodiments.

DESCRIPTION OF THE ILLUSTRATIVE EMBODIMENTS

Figure 1:
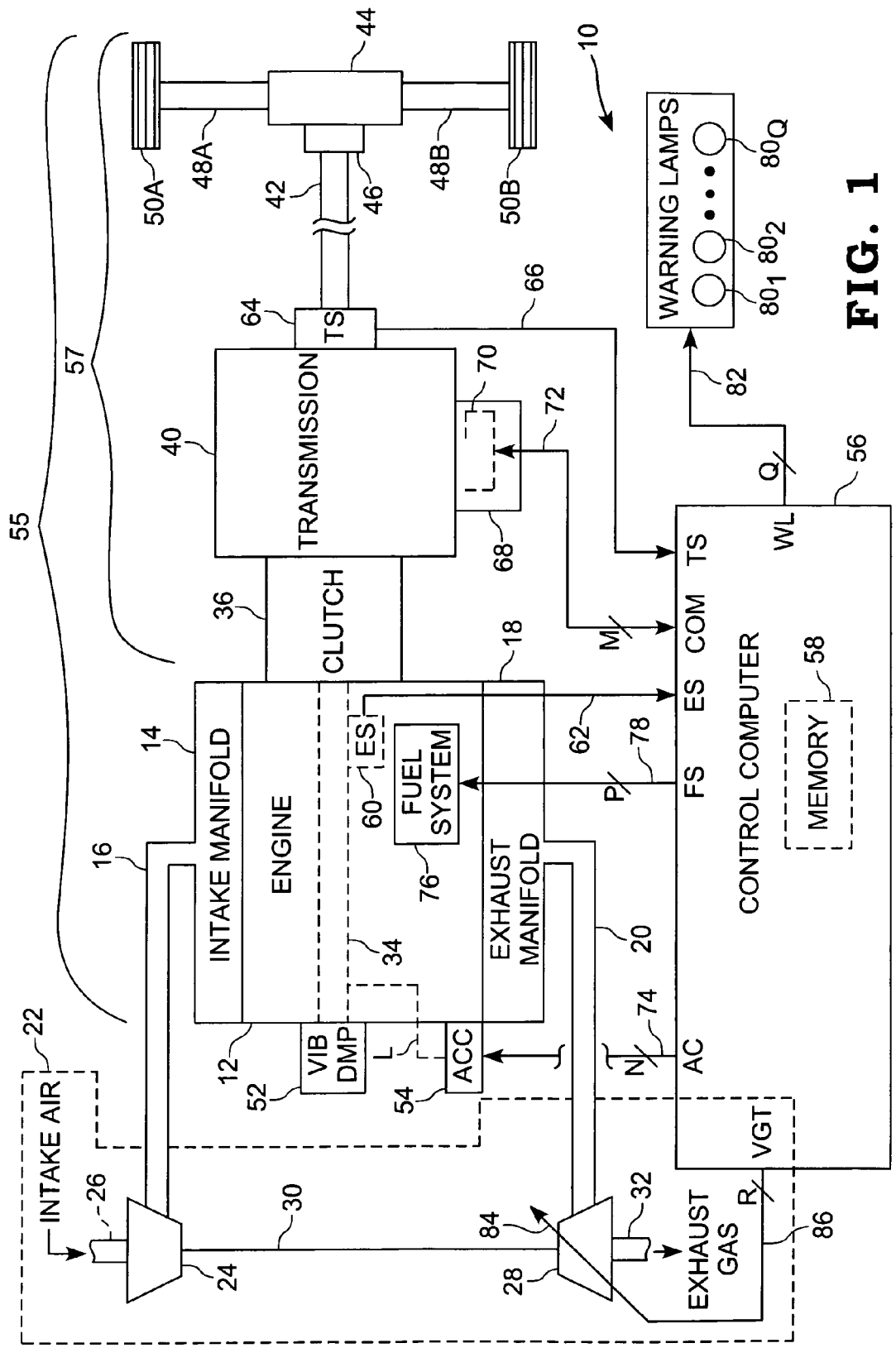
FIG. 1 is a diagram of one illustrative embodiment of a vehicle powertrain torsional processing system.

For the purpose of promoting an understanding of the principles of this disclosure, reference will now be made to a number of embodiments illustrated in the drawings and specific language will be used to describe the same. It will nevertheless be understood that no limitation of the scope of the claims appended hereto is thereby intended.

Referring now to FIG. 1, one illustrative embodiment of a vehicle powertrain torsional processing system 10 is shown. System 10 includes an internal combustion engine 12 having an intake manifold 14 receiving intake air to the engine 12 via intake conduit 16, and an exhaust conduit 18 directing engine exhaust gas to ambient via exhaust conduit 20. Optionally, as shown in phantom in FIG. 2, system 10 may include a turbocharger 22 including a turbocharger compressor 24 having a compressor inlet receiving fresh ambient air via an intake conduit 26 fluidly coupled thereto and a compressor outlet fluidly coupled to the intake conduit 16, wherein the turbocharger compressor 24 is operable to supply fresh ambient air to the intake manifold 14 via intake conduit 16. The turbocharger compressor is rotatably coupled to a turbocharger turbine 28 via a drive shaft 30, and turbine 28 has a turbine inlet fluidly coupled to the exhaust conduit 20 and a turbine outlet fluidly coupled to ambient via exhaust conduit 32. The turbocharger 22 may be conventional in structure and operation.

The engine 12 includes a crankshaft 34 that is rotatably driven by conventional operation of the engine 12, and the crankshaft 34 is operatively coupled to a change gear transmission 40 via a clutch mechanism 36. Clutch 36 may be separate from transmission 40 as illustrated in FIG. 1, or may instead be integrated with the transmission 40 in a conventional manner. In any case, clutch 36 is controlled manually and/or electronically to disengage the selectively disengage the crankshaft 34 from the transmission 40 for gear shifting in a known manner.

The transmission 40 may be a manual transmission having a number of manually selectable gears, an automated manual or semi-automatic transmission having a number of manually selectable gears and one or more automatically selectable gears, or a fully automatic transmission having a number of automatically selectable gears. In embodiments of transmission 40 having one or more automatically selectable gears, transmission 40 may include a transmission control module 68 housing a transmission control computer 70 of known construction. In any case, the transmission 40 is coupled to one end of a tailshaft or propeller shaft 42 via a universal joint (not shown in FIG. 1), and an opposite end of the tailshaft 42 is coupled to a differential 44 via another universal joint 46. The differential 44 is coupled at either end to at least a pair of wheels 50A and 50B via drive axles 48A and 48 B respectively.

The engine 12, clutch 36, transmission 40, tailshaft 42, universal joint 46, differential 44, axles 48A and 48B, and wheels 50A and 50B are all conventional in their construction, and collectively these components define a powertrain 55 of the vehicle carrying system 10, and the collection of powertrain components downstream of the engine 12 are typically referred to as the vehicle drivetrain or driveline 57. It will be understood that the vehicle powertrain 55 and/or drivetrain 57 may include more or fewer components than those illustrated in FIG. 1, and that the number and function of the various powertrain components in any alternate implementation of system 10 will generally be dictated by the application. In any case, operation of the vehicle powertrain 55 is conventional in that output torque produced by the engine 12 is transferred via the crankshaft 34 to the transmission 40 via the clutch 36. The engine output torque is multiplied by a currently engaged gear ratio of the transmission 40, and the resulting output torque is rotatably transferred to the differential 44 via the tailshaft 42 and universal joint(s) 46. The differential 44 is operable to translate the rotary motion of the tailshaft 42 about a longitudinal axis of the tailshaft 42 to rotary motion about a longitudinal axis of the axle components 48A and 48B to drive at least one of the wheels 50A and 50B.

The engine 12 further includes a vibration damper 52 of known construction and mechanically coupled to the crankshaft 34. In one embodiment, damper 52 includes a vaned or toothed wheel rotatably coupled to the crankshaft 34 and housed within a chamber carrying a viscous fluid, although any alternate implementation of damper 52 is intended to fall within the scope of the claims appended hereto. While the engine crankshaft 34 is a generally rigid in construction and machined to rotate smoothly about its longitudinal axis, the discrete and periodic firing operation of the engine 12 causes the crankshaft 34 to be torsionally flexible, and rotation of the vaned or toothed wheel within the viscous fluid of the vibration damper 52 acts to dampen vibrations resulting from rotation of the torsionally flexible crankshaft 34. The engine crankshaft 34 and vibration damper 52, for purposes of this document, are also powertrain components forming part of the vehicle powertrain 55. The crankshaft 34 is further mechanically linked to a number of engine-driven accessories, illustrated collectively in FIG. 1 at 54, via a mechanical linkage, illustrated collectively in FIG. 1 by "L". Examples of engine-driven accessories that may be included within system 10 include, but are not limited to, one or more engine cooling fans, cab or passenger compartment air conditioning system, and the like.

System 10 further includes a control computer 56 that is, in one embodiment, microprocessor-based, and that is generally operable to control and manage the overall operation of engine 12. In this embodiment, control computer 56 may be, for example, a known control unit sometimes referred to as an electronic or engine control module (ECM), electronic or engine control unit (ECU) or the like. Alternatively, control computer 56 may be a general-purpose control circuit or application specific control circuit capable of operation as described hereinafter. In any case, control computer 56 includes or has access to a memory unit 58, and has a number of inputs and outputs for interfacing with various sensors and sub-systems of system 10. For example, engine 12 includes an engine speed sensor 60 of known construction and suitably positioned relative to the engine crankshaft 34. In one embodiment, sensor 60 is a known Hall effect engine speed and position sensor configured to sense passage thereby of a number of teeth formed on a gear or tone wheel rotating synchronously with the crankshaft 34. In this embodiment, sensor 60 is a known sensor operable to produce an engine speed and position signal indicative of engine rotational speed as well as the angular position of the crankshaft 34 relative to a reference crankshaft position. Alternatively, sensor 60 may be a known variable reluctance or other sensor producing an engine speed signal indicative of engine rotational speed. In any case, sensor 60 is electrically connected to an engine speed input, ES, of control computer 56 via signal path 62.

System 10 further includes a tailshaft speed sensor 64 suitably positioned relative to the tailshaft 42 and operable to produce a tailshaft speed signal indicative of the rotational speed of the tailshaft 42. Sensor 64 may be a known variable reluctance or other sensor operable to sense tailshaft rotational speed and produce a tailshaft speed signal corresponding thereto. In any case, sensor 64 is electrically connected to a tailshaft speed input, TS, of control computer 56 via signal path 66.

In embodiments of transmission 40 including a transmission control computer 70, as described hereinabove, computer 70 is microprocessor-based, generally operable to control and manage the overall operation of the transmission 40, and specifically operable to control the automatic gear shifting of transmission 40. Alternatively, the transmission control computer 70 may be a general-purpose control circuit or application specific control circuit capable of operation as described hereinafter. In any case, both the transmission control computer 70 and the engine control computer 56 include communication ports, COM, (shown in FIG. 1 only with respect to control computer 56) configured for data communications according to a predefined data communications protocol. Connected between the respective communications ports, COM, is a communications link 72 including any number, M, of signal lines, wherein M may be any positive integer. In one embodiment, the communication ports, COM, of the transmission control computer 70 and the engine control computer 56 are configured for communications according to a known SAE J1939 serial communications protocol, and the communications link 72 is a serial communications hardware link also configured for communications according to the SAE J1939 communications protocol. It will be understood, however, that the transmission control computer 70, the engine control computer 56 and the communications link 72 may alternatively configured for communications according to another known serial or parallel communications protocol, and that communications link 72 may alternatively still be or include a wireless communications link.

Control computer 56 further includes a number of outputs for controlling sub-systems, actuators and diagnostic equipment forming part of system 10. For example, control computer 56 includes a number, N, of accessory control outputs, illustrated generally in FIG. 1 by a single actuator control output, AC, that is electrically connected to the number of engine-driven accessories, 54, via N corresponding signal paths 74, wherein "N" may be any positive integer. The control computer 56 is operable to control the various engine-driven accessories 54 in a known manner via corresponding ones of the "N" signal paths 74.

Engine 12 further includes a fuel system 76 of known construction and connected to a fueling signal output, FS, of control computer 56 via a number, P, of signal paths 78, wherein "P" may be any positive integer. Control computer 56 is operable to determine one or more fueling commands, FC, as a function of a number of engine operating parameters, in a manner well known in the art, wherein the fueling commands, FC, include information relating to the quantity and timing of fuel supplied to the engine 12 by the fuel system 76. The fueling commands, FC, are converted by control computer 56 to fuel control signals, which are provided by control computer 56 on signal paths 78 to control operation of the fuel system 76 in a known manner. From the fueling commands, FC, control computer 56 is further operable to determine an engine load value, EL, as a function of the fuel commands, FC, in a conventional manner. In one embodiment, for example, control computer 56 is operable to compute the engine load value, EL, as a ratio of FC values and the difference between a "full-load" fueling value and a "no-load" fueling value, wherein the "full-load" and "no-load" fueling values are typically calibratible values stored in memory 55. Those skilled in the art will recognize that control computer 56 may alternatively be configured to compute the engine load value, EL, according to other known functions of the fuel command values, FC, and/or other engine operating conditions, and any other such alternate configuration of control computer 56 is intended to fall within the scope of the claims appended hereto. In any case, the engine load value, EL, is generally a parameter that is indicative of the amount of work being done by the engine 12.

System 10 further includes a number, Q, of warning lamps, $80_1$–$80_Q$, electrically connected to a warning lamp output port, WL, of control computer 56 via a corresponding number of Q signal paths 82, wherein "Q" may be any positive integer. Control computer 56 is operable to illuminate any one or more of the warning lamps, $80_1$–$80_Q$, by producing one or more corresponding control signals on an appropriate one or more of the signal paths 82.

Figure 2A:
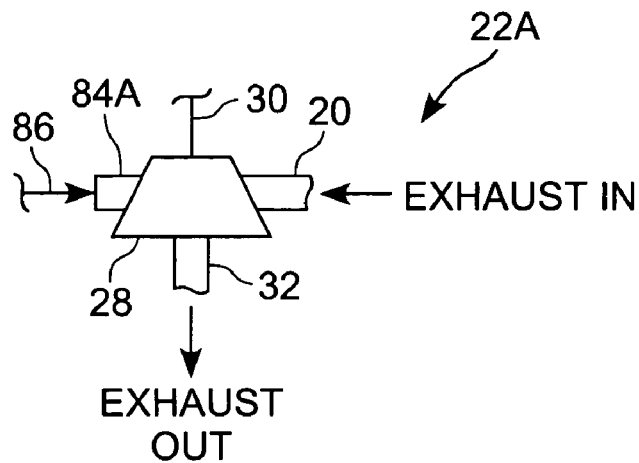
FIG. 2A is a diagram of one illustrative VGT actuator that may be used to control the swallowing capacity and/or efficiency of a turbocharger included in the system of FIG. 1.
Figure 2B:
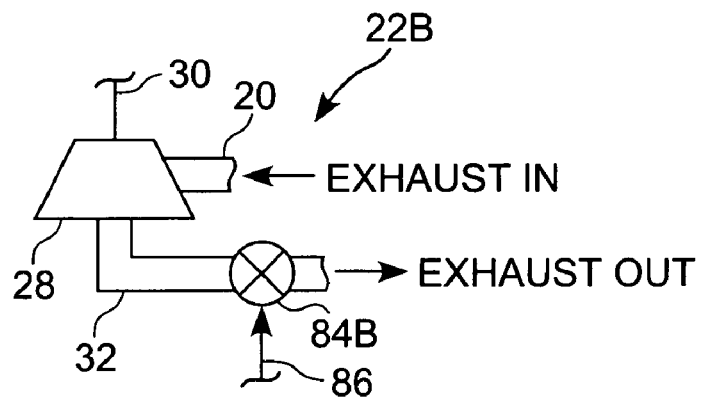
FIG. 2B is a diagram of another illustrative VGT actuator that may be used to control the swallowing capacity and/or efficiency of a turbocharger included in the system of FIG. 1.

In embodiments of system 10 including a turbocharger 22, the turbocharger 22 may be equipped with any of a number, R, of mechanisms, illustrated generally at 84 in FIG. 1 and electrically connected to a variable geometry turbocharger output, VGT, of control computer 56 via a corresponding number, R, of signal paths 86, for controlling the swallowing capacity and/or efficiency of the turbocharger. Referring to FIG. 2A, for example, one embodiment 22A of the turbocharger 22 of FIG. 1 is shown including one illustrative turbocharger swallowing capacity control mechanism 84A. Mechanism 84A illustrated in FIG. 2A is a variable geometry turbocharger actuator and is responsive to a VGT control signal produced by control computer 56 on signal path 86 to correspondingly modify the geometry of the turbine 28 in a known manner to thereby modify the swallowing capacity of the turbocharger 22. Another embodiment 22B of the turbocharger 22 of FIG. 1 is shown in FIG. 2B, and includes one illustrative turbocharger swallowing efficiency control mechanism 84B. Mechanism 84B illustrated in FIG. 2B is an exhaust throttle valve disposed in-line with exhaust conduit 32, and is responsive to a VGT control signal produced by control computer 56 on signal path 86 to control the flow volume of exhaust gas through exhaust conduit 32 to thereby control the swallowing efficiency of the turbine 28. Exhaust throttle valve 84B may alternatively be disposed in-line with exhaust conduit 20.

Figure 2C:
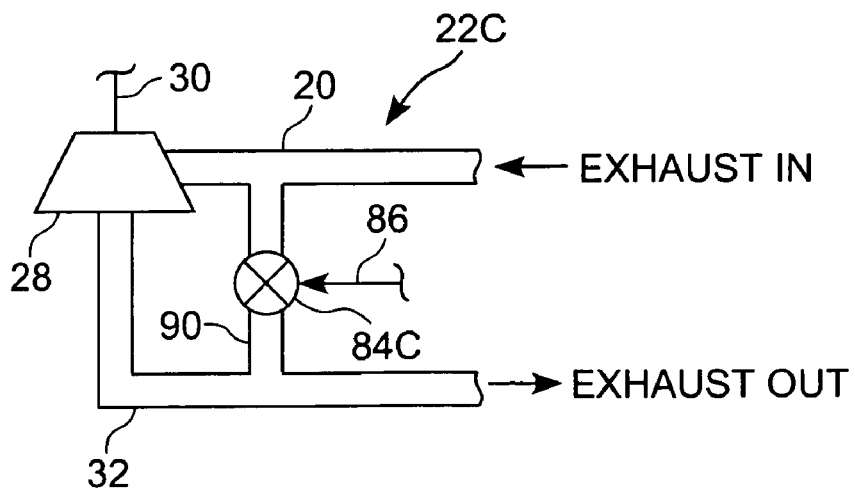
FIG. 2C is a diagram of yet another illustrative VGT actuator that may be used to control the swallowing capacity and/or efficiency of a turbocharger included in the system of FIG. 1.

Yet another embodiment 22C of the turbocharger 22 of FIG. 1 is shown in FIG. 2C, and includes one illustrative turbocharger swallowing capacity and efficiency control mechanism 84C. Mechanism 84C is a wastegate valve disposed in-line with an exhaust conduit 90 fluidly connected between exhaust conduits 20 and 32. Wastegate valve 84C is responsive to a VGT control signal produced by control computer 56 on signal path 86 to selectively divert exhaust gas flowing through exhaust conduit 20 away from the turbine 28 to thereby modify the swallowing capacity and efficiency of the turbocharger 22. Those skilled in the art will recognize that system 10 may include any one or combination of the turbocharger swallowing capacity and/or efficiency mechanisms illustrated in FIGS. 2A–2C, wherein the operation of any such one or combination of mechanisms may be controlled in a known manner by control computer 56 to thereby selectively control the swallowing capacity and/or efficiency of the turbocharger 22.

As described hereinabove, the discrete and periodic firing operation of the engine 12 causes the otherwise rigid crankshaft 34 to be torsionally flexible, and the same is true of each of the powertrain components that are rotatably driven by the crankshaft 34. Torsional information, in the form of one or more torsional components, or torsional modes, resulting from vibration of the entire powertrain 55 as it is rotatably driven is determined by system 10, and processed to diagnose and/or control the occurrence and/or magnitude of such torsional components or modes. For purposes of this document, the term "Nth-order torsional component" is defined as the Nth-order component of the torsional vibrations of the powertrain as its components are rotatably driven, wherein "N" may be any positive integer or real number.

Figure 3:
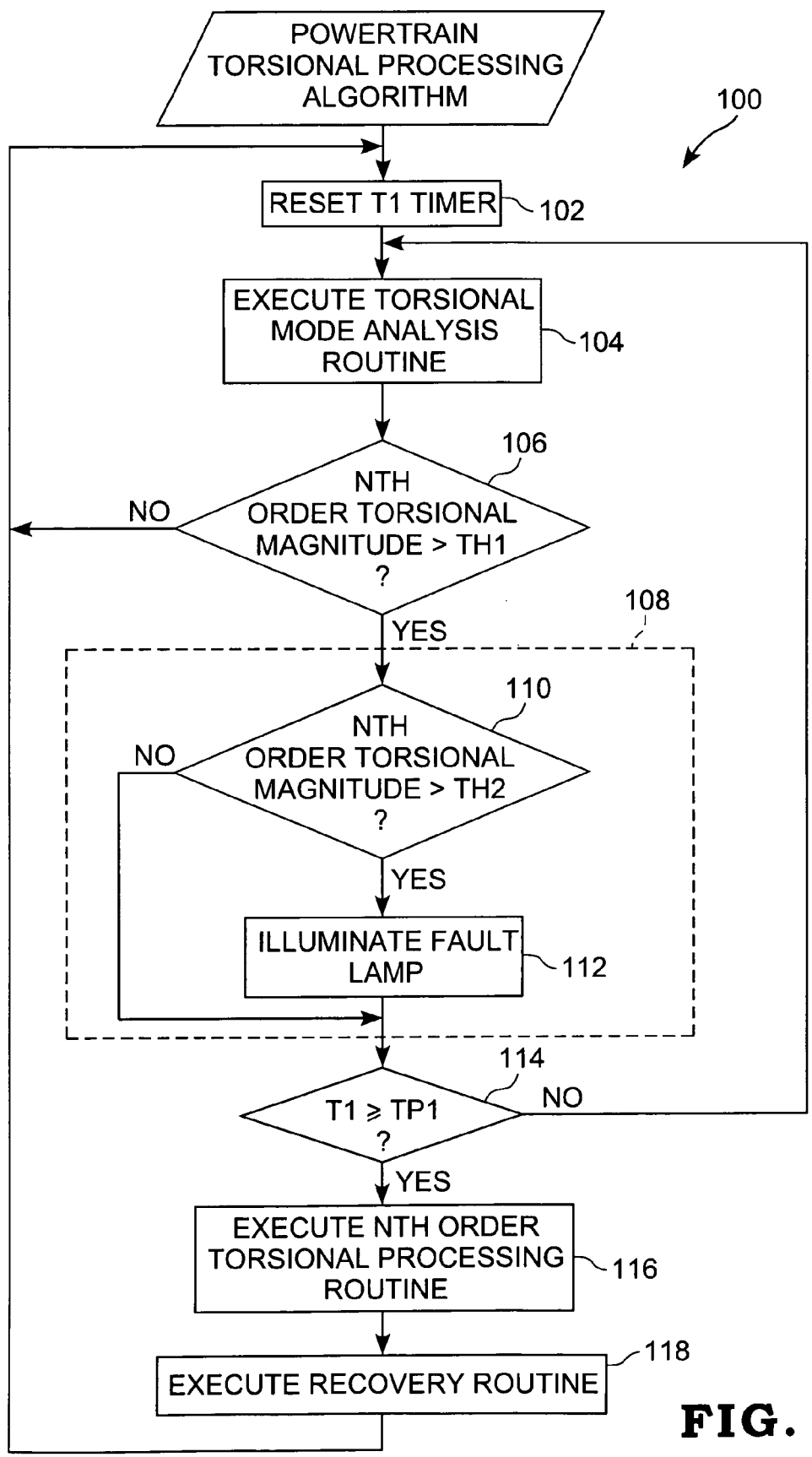
FIG. 3 is a flowchart of one illustrative embodiment of a software algorithm for processing powertrain torsional information.

Referring now to FIG. 3, a flowchart of one illustrative embodiment of a software algorithm 100 for processing powertrain torsional information is shown. In one embodiment, algorithm 100 is stored in memory 58 and executed by control computer 56, although algorithm 100 may alternatively be stored in a memory unit associated with the transmission control module 68 and/or control computer 70 and executed by control computer 70. In either case, information available to either control computer 56 or 70 may be shared therebetween via communications link 72 in a known manner. The various steps of algorithm 100 will be described herein as being executed by control computer 56, although it will be understood that any one or more of such steps may alternatively be executed by control computer 70. In any case, algorithm 100 begins at step 102 where a first timer within control computer 56, having a time value T1, is reset to zero or some other reference time value by control computer 56. Thereafter at step 104, control computer 56 is operable to execute a torsional mode analysis routine to determine the magnitude(s) of an Nth-order torsional component(s) of interest.

Figure 4:
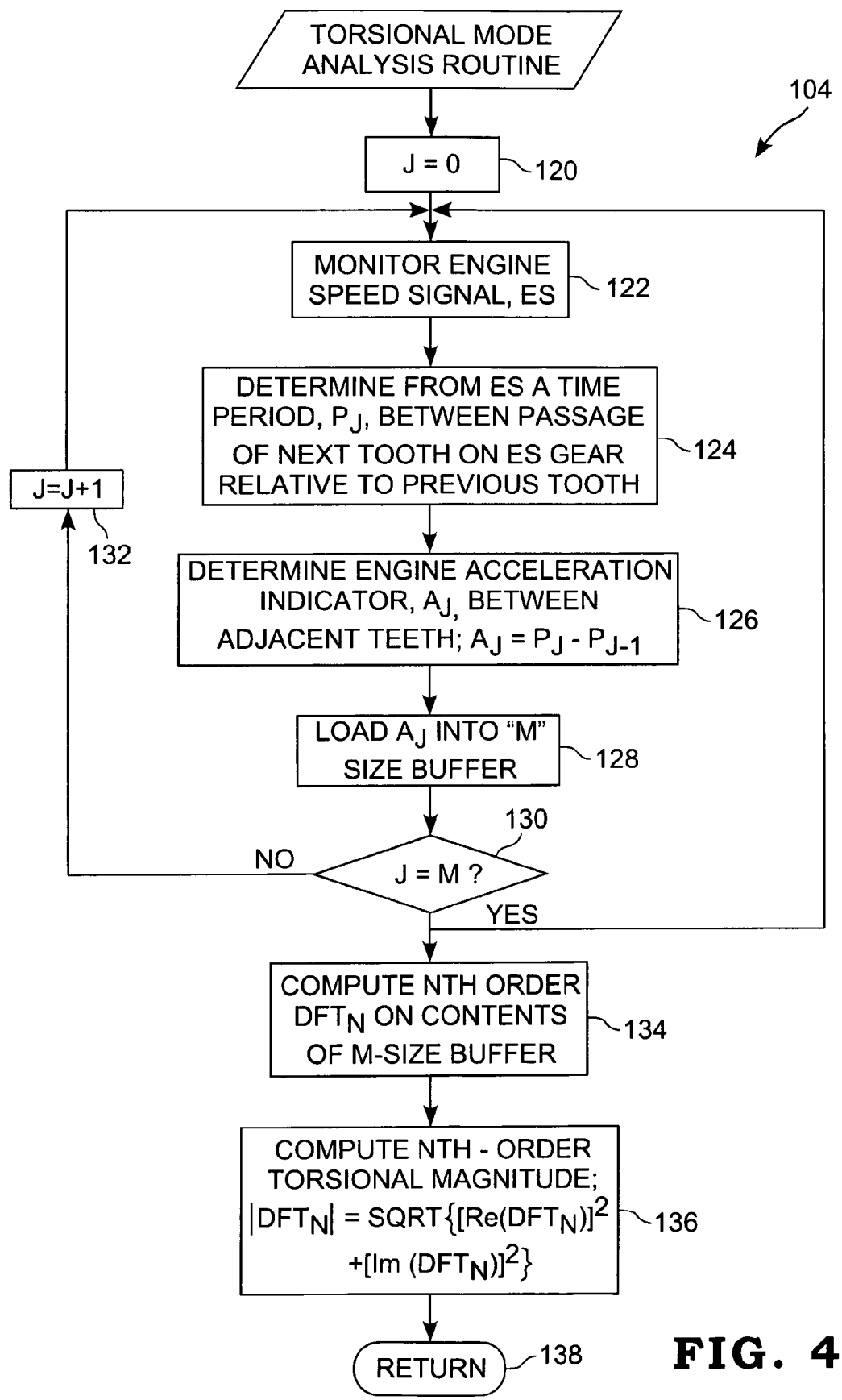
FIG. 4 is a flowchart of one illustrative embodiment of the torsional mode analysis routine called by the algorithm of FIG. 3.

Referring now to FIG. 4, a flowchart of one illustrative embodiment of a software algorithm 104 for executing the torsional mode analysis routine called by step 104 of algorithm 100 is shown. Algorithm 104 begins at step 120 where control computer 56 is operable to set a counter, J, equal to zero. Thereafter at step 122, control computer 56 is operable to monitor the engine speed signal, ES, produced by the engine speed sensor 60 of FIG. 1. Following step 122, control computer 56 is operable at step 124 to determine from the engine speed signal, ES, a time period, $P_J$, between the passage by the engine speed sensor 60 of a next tooth of a gear or tone wheel rotating synchronously with the engine crankshaft 34 relative to a preceding tooth, wherein the gear or tone wheel may have any number of such teeth. In the illustrated embodiment, the control computer 56 is operable to determine $P_J$ at step 124 by measuring the time difference between fluctuations in the engine speed signal, ES, resulting from the detection of corresponding teeth on the gear or tone wheel.

Following step 124, the control computer 56 is operable at step 126 to determine an engine acceleration indicator, $A_J$, corresponding to a measure or indicator of engine acceleration between the individual teeth on the gear or tone wheel rotating synchronously with the crankshaft 34. In the illustrated embodiment, for example, the engine acceleration indicator, $A_J$, is computed at step 126 as a difference between measured time periods $P_J$ and $P_{J-1}$. Thereafter at step 128, control computer 56 is operable load the engine acceleration indicator computed at step 126 into an "M" size buffer, wherein "M" is equal to the number of engine acceleration indicator values that will be used to determine Nth-order torsional information. In one embodiment, for example, "M" is equal to the number of $A_J$ values required to span a desired rotation angle; e.g., 720 degrees, of the engine crankshaft 34. It will be appreciated, however, that "M" may alternatively be any desired value that provides a sufficient number of $A_J$ values that ensures a desired accuracy of the Nth-order torsional information that will be subsequently determined.

In any case, algorithm execution advances from step 128 to step 130 where control computer 56 is operable to compare the counter "J" to the buffer size "M". If, at step 130, the control computer 56 determines that "J" is not equal to "M", then the "M" size buffer is not yet full and algorithm execution advances to step 132 where control computer 56 is operable to increment the counter "J" by one and then loop back to step 122. If, on the other hand, the control computer 56 determines at step 130 that "J" is equal to "M", then the "M" size buffer is full and algorithm execution advances to step 134 and also loops back to step 122. In the illustrated embodiment, the "M" size buffer is configured as a conventional rolling buffer in that once the buffer is filled with "M" data values, the next data value enters the buffer adjacent to the next most recent data value, the oldest data value drops out of the buffer, and the remaining data values are shifted by one position toward the oldest data value. In this way, the "M" size buffer holds only the "M" most recently determined data values.

At step 134, the control computer 56 is operable to process the engine acceleration indicator information stored in the M-size buffer in a conventional manner to compute the Nth-order torsional information. In the illustrated embodiment, the control computer 56 is operable to execute step 134 by computing an Nth-order Discrete Fourier Transform, $DFT_N$, on the entire contents; e.g., all "M" data values, of the "M" size buffer. Following step 134, the control computer 56 is operable at step 136 to compute the Nth-order torsional magnitude according to the equation $|DFT_N|=SQRT\{[Re(DFT_N)]^2+[Im(DFT_N)]^2\}$. Alternatively, the control computer 56 may be operable at steps 134 and 136 to compute the Nth-order torsional information in accordance with one or more other known techniques. In any case, algorithm execution advances from step 136 to step 138 where execution of the torsional mode analysis routine 104 returns to step 104 of algorithm 100.

In the embodiment illustrated in FIG. 4, steps 120–132 are generally executed at a frequency that captures detection of every tooth on the gear or tone wheel rotating synchronously with the crank shaft 34. In one specific embodiment, for example, these steps are executed at every falling edge of the engine speed signal, ES. In any case, the control computer 56 is operable to continually execute steps 120–132 to continually maintain the most recent "M" data values within the M-sized buffer. Steps 134–138, on the other hand, are executed at the same rate as that of algorithm 100, e.g., 100 milliseconds, and the Nth-order torsional magnitude computed at steps 134 and 136 is accordingly based on the most recently determined engine acceleration indicator information, $A_N$.

It will be understood that steps 134 and 136 of the algorithm of FIG. 4 may be configured to determine any number of Nth-order torsional magnitude values, i.e., for any one or more values of "N". Those skilled in the art will further recognize that the torsional mode analysis routine illustrated in FIG. 4 represents only one illustrative technique for determining the Nth-order torsional magnitude information, and that the engine speed signal, ES, may be processed according to one or more other known signal processing techniques to determine other engine acceleration information from which the Nth-order torsional magnitude information may be determined. Any such other signal processing techniques are intended to fall within the scope of the claims appended hereto.

Referring again to algorithm 100 of FIG. 3, algorithm execution advances from step 104 to step 106 where control computer 56 is operable to determine whether the magnitude of the Nth-order torsional is greater than a threshold magnitude, TH1. If not, algorithm execution loops back to step 102 to reset the first timer. If, on the other hand, control computer 56 determines at step 106 that the Nth-order torsional magnitude is greater than the threshold value, TH1, algorithm execution advances. In the illustrated embodiment, the threshold magnitude, TH1, is set to a value above which extended operation under such conditions may result in undesirable wear, and eventual damage, to one or more of the powertrain components of powertrain 55. In one embodiment of algorithm 100, an optional step 108 is included, and the "YES" branch of step 106 advances thereto. Step 108 includes a first step 110 at which control computer 56 is operable to determine whether the magnitude of the Nth-order torsional is greater than another threshold magnitude, TH2. If not, algorithm execution advances to step 114. If, on the other hand, control computer 56 determines at step 110 that the Nth-order torsional magnitude is greater than the threshold value, TH2, algorithm execution advances to step 112 where control computer 56 is operable to produce an appropriate control signal at output port WL to illuminate a desired one of the fault lamps $80_1$–$80_Q$. Threshold TH2, in embodiments wherein step 108 is included, is set to a value generally greater than TH1, and in one embodiment is set to a value above which transient operation under such conditions may be considered undesirable or dangerous to one or more of the powertrain components of powertrain 55.

Step 112, or the "YES" branch of step 106 if step 108 is not included, advances to step 114 where control computer 56 is operable to compare the time value, T1, of the first timer to a time period, TP1. If control computer 56 determines at step 114 that T1 is less than TP1, algorithm execution loops back to step 104. If, on the other hand, control computer determines at step 114 that at least the time period, TP1, has elapsed, algorithm execution advances to step 116 where control computer 56 is operable to execute an Nth-order torsional processing algorithm. In the illustrated embodiment, TP1 is set to a time value beyond which operation with the magnitude of the Nth-order torsional greater than TH1 may result in undesirable wear, and eventual damage, to one or more of the powertrain components of powertrain 55. In any case, algorithm 100 thus advances to step 116 only if the magnitude of the Nth-order torsional has exceeded the threshold magnitude, TH1, for at least the time period TP1.

Figure 5A:
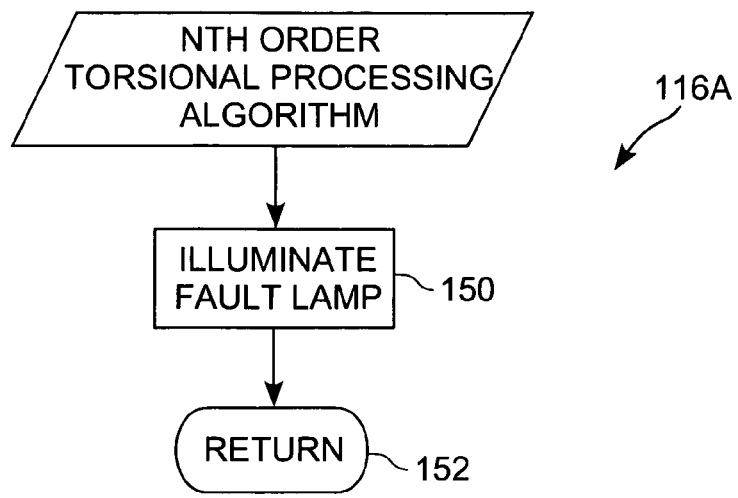
FIG. 5A is a flowchart of one illustrative embodiment of the Nth-order torsional processing routine called by the algorithm of FIG. 3.

Referring now to FIG. 5A, a flowchart of one illustrative embodiment 116A of the Nth-order torsional processing algorithm called at step 116 of the algorithm 100 of FIG. 3 is shown. Algorithm 116A begins at step 150 where control computer 56 is operable to produce an appropriate control signal at output port WL to illuminate a desired one of the fault lamps $80_1$–$80_Q$. Thereafter at step 152, algorithm 116A is returned to step 116 of algorithm 100. Algorithm 116A thus represents a diagnostic routine relating to the Nth-order torsional wherein control computer 56 is operable to illuminate an appropriate one of the fault lamps $80_1$–$80_Q$ if the magnitude of the Nth-order torsional has exceeded the threshold magnitude, TH1, for at least the time period TP1.

Figure 5B:
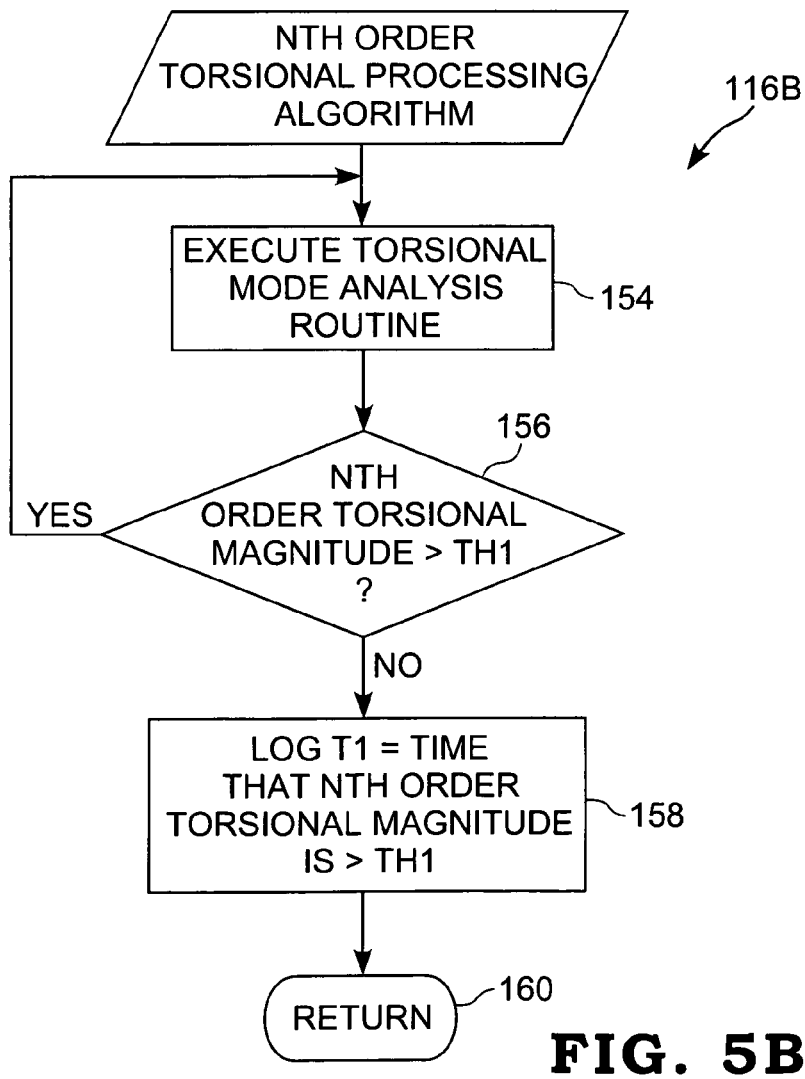
FIG. 5B is a flowchart of another illustrative embodiment of the Nth-order torsional processing routine called by the algorithm of FIG. 3.

Referring now to FIG. 5B, a flowchart of another illustrative embodiment 116B of the Nth-order torsional processing algorithm called at step 116 of the algorithm 100 of FIG. 3 is shown. Algorithm 116B begins at step 154 where control computer 56 is operable to execute a torsional mode analysis routine, such as the algorithm 104 illustrated in FIG. 4, to determine the magnitude(s) of the Nth-order torsional of the vehicle powertrain 55. Thereafter at step 156, control computer is operable to compare the magnitude(s) of the Nth-order torsional with the threshold magnitude, TH1. As long as the magnitude(s) of the Nth-order torsional is greater than TH1, algorithm execution loops back to step 154, and otherwise algorithm execution advances to step 158 where control computer is operable to log in memory unit 55 the total time, T1, that has elapsed with the magnitude(s) of the Nth-order torsional greater than the threshold magnitude, TH1. Thereafter at step 160, algorithm 116B is returned to step 116 of algorithm 100. Algorithm 116B thus represents another diagnostic routine relating to the Nth-order torsional wherein control computer 56 is operable to log in memory the time period, T1, that has elapsed with the magnitude(s) of the Nth-order torsional greater than the threshold magnitude, TH1.

Figure 5C:
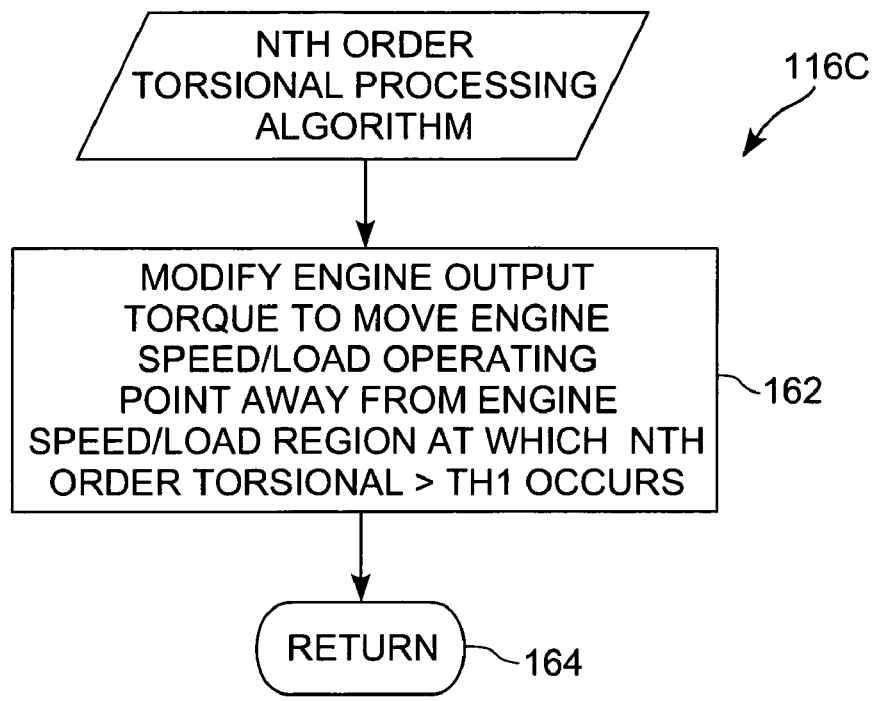
FIG. 5C is a flowchart of yet another illustrative embodiment of the Nth-order torsional processing routine called by the algorithm of FIG. 3.

Referring now to FIG. 5C, a flowchart of yet another illustrative embodiment 116C of the Nth-order torsional processing algorithm called at step 116 of the algorithm 100 of FIG. 3 is shown. Algorithm 116C begins at step 162 where control computer 56 is operable to modify the output torque produced by the engine 12 to move the engine operating point, i.e., the engine speed and engine load operating point, away from an engine speed and load region at which the Nth-order torsional occurs in excess of the threshold magnitude, TH1. Engine speed information is provided by the engine speed sensor 60, and engine load information is determined by control computer 56 as described hereinabove.

Figure 6:
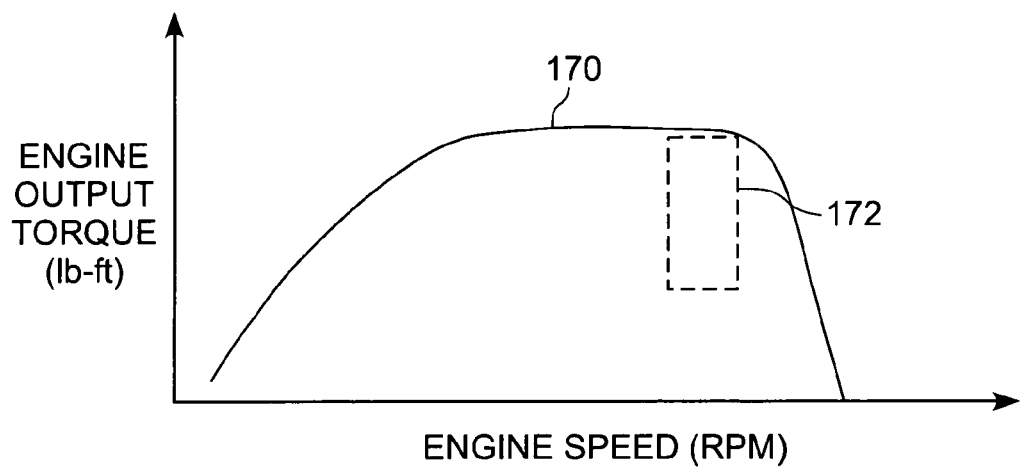
FIG. 6 is a plot of engine output torque vs. engine rotational speed illustrating the operation of either of the routines of FIGS. 5C and 5D.

Referring to FIG. 6, a plot of engine output torque vs. engine speed is shown for one example implementation of engine 12. The plot of FIG. 6 defines an output torque map bounded by a maximum output torque curve 170 over a specified range of engine speeds. Within the example engine output torque map illustrated in FIG. 6, the engine speed and load region 172 corresponds to a region of engine speed and load values at which the Nth-order torsionals of the vehicle powertrain 55 exceed the threshold magnitude, TH1. Prior to step 162 of algorithm 116B, then, the engine speed and load operating point of the engine 12 lies within region 172, and the function of step 162 is to move this engine speed and load operating point of the engine 12 away from region 172. Generally, the engine speed and load operating point of the engine 12 may be moved at step 162 by modifying either of engine speed and engine load, and either, or a combination, of such techniques is intended to fall within the scope of the claims appended hereto. For example, control computer 56 may be operable at step 162 to modify engine speed and load by modifying; e.g., increasing or decreasing, engine fueling via control of the fuel system 76 as described hereinabove. As another example, control computer 56 may be operable at step 162 to modify engine speed by controlling any one or combination of the air handling control mechanisms described hereinabove with respect to FIGS. 2A–2C. As yet another example, control computer 56 may be operable at step 162 to modify engine load by controlling the loading on engine 12 by one or more of the engine accessories 54. It will be understood that control computer 56 may be generally operable at step 162 to control engine speed and/or load via any one, or combination, of at least the foregoing engine speed/load modification techniques to move the engine speed and load operating point of the engine 12 away from region 172.

In any case, step 162 of algorithm 116C advances to step 164 wherein algorithm 116C is returned to step 116 of algorithm 100. Algorithm 116C thus represents a control routine for controlling operation of the vehicle powertrain 55 away from conditions at which the magnitude of the Nth-order torsional exceeds the threshold magnitude, TH1, wherein control computer 56 is operable to accomplish this control by appropriately modifying engine output torque via direct control of engine speed, engine load or a combination thereof.

Figure 5D:
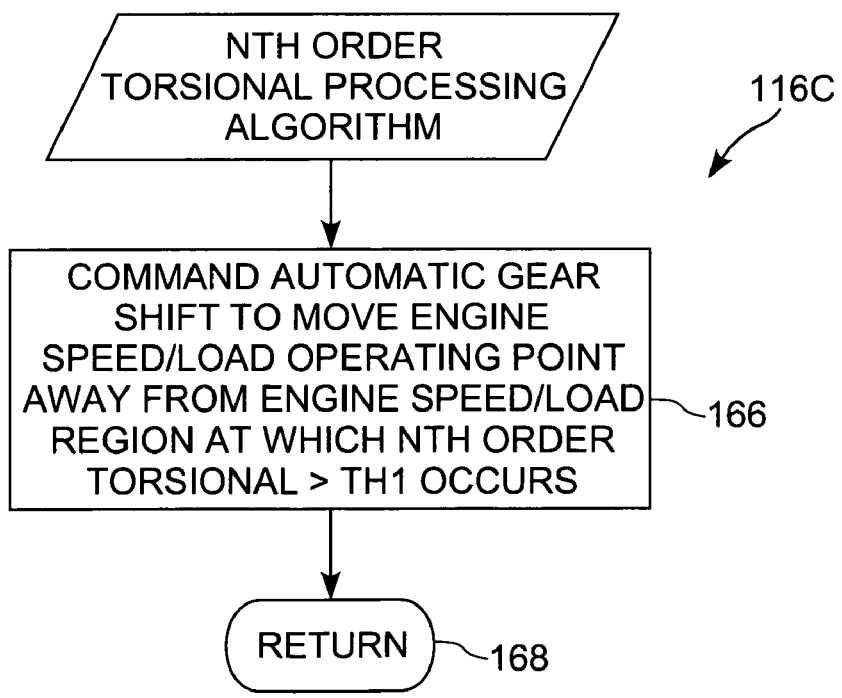
FIG. 5D is a flowchart of still another illustrative embodiment of the Nth-order torsional processing routine called by the algorithm of FIG. 3.

Referring now to FIG. 5D, a flowchart of still another illustrative embodiment 116D of the Nth-order torsional processing algorithm called at step 116 of the algorithm 100 of FIG. 3 is shown. Algorithm 116D begins at step 166 where control computer 56 is operable to command an automatic gear shift by transmission 40 to another automatically selectable gear to move the engine speed and engine load operating point away from an engine speed and load region (e.g., see example illustrated in FIG. 6) at which the Nth-order torsional occurs in excess of the threshold magnitude, TH1. Control computer 56 is operable to issue such a command to the transmission control computer 70, and the transmission control computer 70 is responsive to this command to control automatic shifting to a different transmission gear in a known manner. In any case, step 166 of algorithm 116D advances to step 168 wherein algorithm 116D is returned to step 116 of algorithm 100. Algorithm 116D thus represents a control routine for controlling operation of the vehicle powertrain 55 away from conditions at which the magnitude of the Nth-order torsional exceeds the threshold magnitude, TH1, wherein control computer 56 is operable to accomplish this control by commanding an automatic gear shift by transmission 40 to a different gear to thereby selectively move the engine speed and load operating point.

Figure 7A:
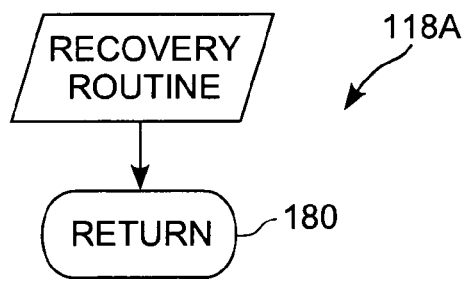
FIG. 7A is a flowchart of one illustrative embodiment of the recovery routine called by the algorithm of FIG. 3.

Referring again to FIG. 3, execution of algorithm 100 advances from step 116 to step 118 where control computer 56 is operable to execute a recovery routine following execution of the Nth-order torsional processing routine. Referring to FIG. 7A, a flowchart of one illustrative embodiment 118A of the recovery routine called at step 118 of the algorithm 100 of FIG. 3 is shown. Algorithm 118A begins at step 180 where control computer 56 is operable to return algorithm 118A to step 118 of algorithm 100. Algorithm 118A thus represents a recovery routine requiring no action on the part of control computer 56, and may be used, for example, with embodiments of the Nth-order torsional processing algorithm called by step 116 of algorithm 100 that are diagnostic in nature, e.g., algorithm 116A and/or algorithm 16B.

Figure 7B:
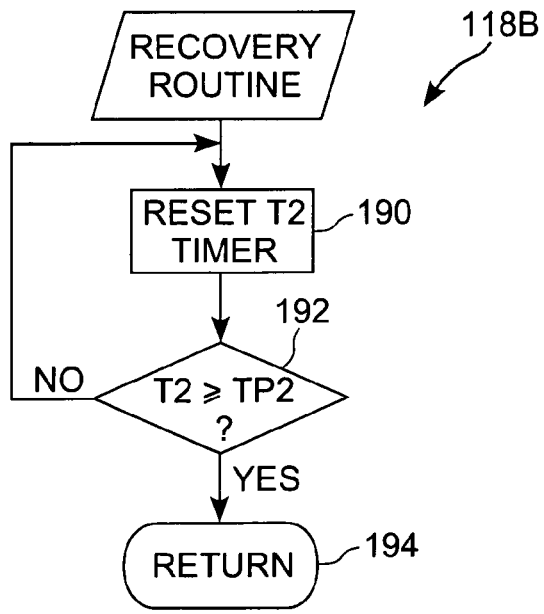
FIG. 7B is a flowchart of another illustrative embodiment of the recovery routine called by the algorithm of FIG. 3.

Referring to FIG. 7B, a flowchart of another illustrative embodiment 118B of the recovery routine called at step 118 of the algorithm 100 of FIG. 3 is shown. Algorithm 118B begins at step 190 where a second timer within control computer 56, having a time value T2, is reset to zero or some other reference time value by control computer 56. Thereafter at step 192, control computer 56 is operable to compare the time value, T2, of the second timer to a time period, TP2. If control computer 56 determines at step 192 that T2 is less than TP2, algorithm execution loops back to step 190. If, on the other hand, control computer determines at step 192 that at least the time period, TP2, has elapsed, algorithm execution advances to step 194 where control computer 56 is operable to return algorithm 118B to step 118 of algorithm 100. Algorithm 118B thus represents a recovery routine requiring a delay of a time period, TP2, following execution of the Nth-order torsional processing algorithm called by step 116 of algorithm 100, and may be used, for example, with embodiments of the Nth-order torsional processing algorithm that control, or command control of, a system actuator, and wherein the reaction of system 10 in response to the actuator action requires the passage of some time to manifest. In the illustrated embodiment, TP2 is thus set to an appropriate time value after which the reaction of system 10 to the actuator action is manifested. In any case, referring again to FIG. 3, algorithm 100 loops from step 118 back to step 102 for another execution of algorithm 100.

Figure 8:
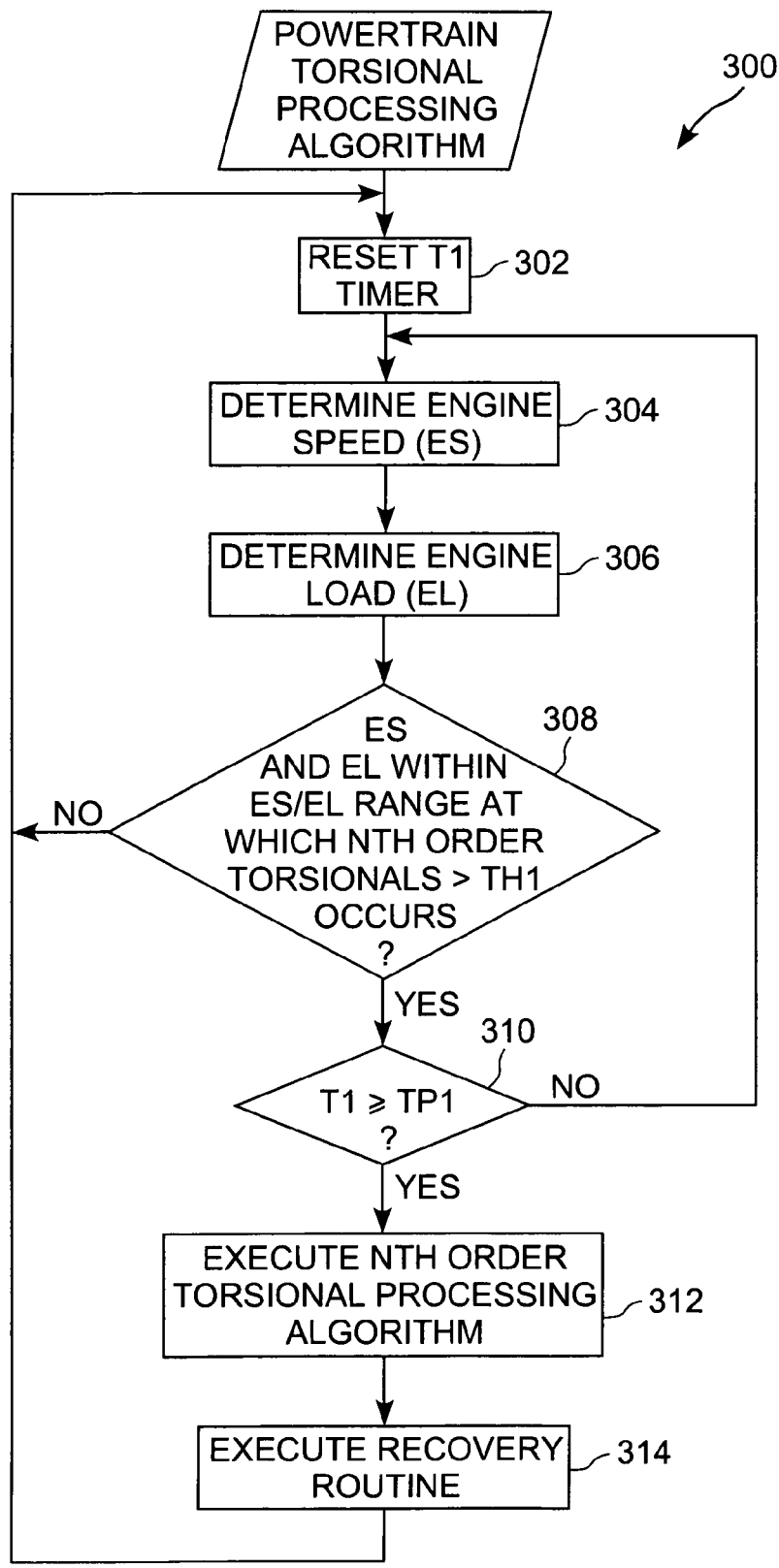
FIG. 8 is a flowchart of another illustrative embodiment of a software algorithm for processing powertrain torsional information.

Referring now to FIG. 8, a flowchart of another illustrative embodiment of a software algorithm 300 for processing powertrain torsional information is shown. As with algorithm 100, algorithm 300 may be stored in memory 58 and executed by control computer 56, although algorithm 300 may alternatively be stored in a memory unit associated with the transmission control module 68 and/or control computer 70 and executed by control computer 70. In either case, information available to either control computer 56 or 70 may be shared therebetween via communications link 72 in a known manner. The various steps of algorithm 300 will be described herein as being executed by control computer 56, although it will be understood that any one or more of such steps may alternatively be executed by control computer 70. In any case, algorithm 300 begins at step 302 where a first timer within control computer 56, having a time value T1, is reset to zero or some other reference time value by control computer 56. Thereafter at step 304, control computer 56 is operable to determine engine speed, ES, via the engine speed signal produced by engine speed sensor 60. Thereafter at step 306, control computer 56 is operable to determine engine load, EL, using any one or more of the techniques described hereinabove.

Following step 306, algorithm 300 advances to step 308 where control computer 56 is operable to determine whether engine speed, ES, and engine load, EL, are within an engine speed and engine load range or region in which Nth-order torsionals having magnitudes greater than a threshold magnitude, TH1, generally occur, wherein TH1 may be as described hereinabove with respect to algorithm 100 of FIG. 3. In this embodiment, memory 58 has stored therein any one or combination of a table, graph or chart defining the engine speed and engine load range or region wherein Nth-order torsionals generally have magnitudes greater than the threshold magnitude, TH1, wherein such an engine speed and engine load range or region will generally be determined through experimentation for any particular application. Control computer 56 is operable, in this embodiment, to execute step 308 by comparing current values of engine speed, ES, and engine load, EL, to the engine speed and load range or region stored in memory 58. If, at step 308, control computer 56 determines that ES and EL are not within the engine speed and load range or region in which Nth-order torsionals having magnitudes greater than TH1 generally occur, algorithm execution loops back to step 302. If, on the other hand, control computer 56 determines at step 308 that ES and EL are within the engine speed and load range or region in which Nth-order torsionals having magnitudes greater than TH1 generally occur, algorithm execution advances to step 310.

At step 310, control computer 56 is operable to compare the time value, T1, of the first timer to a time period, TP1.

If control computer 56 determines at step 310 that T1 is less than TP1, algorithm execution loops back to step 304. If, on the other hand, control computer determines at step 310 that at least the time period, TP1, has elapsed, algorithm execution advances to step 312. In the illustrated embodiment, TP1 is set to a time value beyond which operation with the magnitude of the Nth-order torsional greater than TH1 may result in undesirable wear, and eventual damage, to one or more of the powertrain components of powertrain 55. In any case, algorithm 300 advances to step 312 only if the engine speed, ES, and engine load, EL, are within the engine speed and engine load range or region in which Nth-order torsional having magnitudes greater than TH1 generally occur for at least the time period TP1. At step 312, control computer 56 is operable to execute an Nth-order torsional processing algorithm, such as any one or combination of the Nth-order torsional processing algorithms illustrated in FIGS. 5A–5D, and thereafter at step 314 control computer 56 is operable to execute a recovery routine, such as any one or combination of the recovery routines illustrated in FIGS. 7A–7B. Algorithm 300 loops from step 314 back to step 302 for another execution of algorithm 300.

Figure 9:
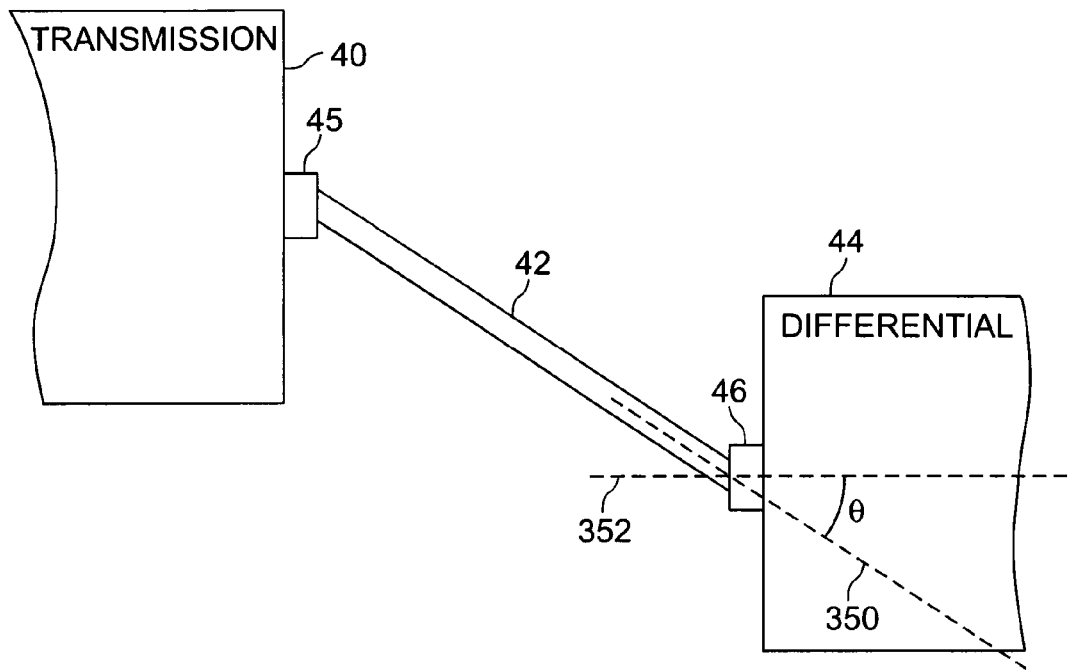
FIG. 9 is a diagram of the mechanical link between the transmission and differential in the system of FIG. 1 illustrating one practical application of the powertrain torsional processing algorithm of either of FIGS. 3 and 8.

The various torsional components, or modes, of the rotational vibrations of vehicle powertrain 55, if allowed to occur at elevated magnitudes for a period of time, may result in undesirable wear, and eventual destruction, of one or more of the components making up the vehicle powertrain 55. In a particular 6-cylinder engine configuration, for example, ½-order torsionals relate to engine misfiring conditions, $1^{st}$-order torsionals relate to balance (or imbalance of the drivetrain 57), $2^{nd}$-order torsionals relate to misalignment in the angular relationship of certain drivetrain components, $3^{rd}$-order torsionals relate to the engine firing frequency, and 4½ and $6^{th}$-order torsionals relates powertrain imbalance to engine firing frequency. Information relating to such vehicle powertrain torsional modes may be used to diagnose and/or control undesirable torsional mode operation as described hereinabove with respect to FIGS. 3 and 8, and one specific example of a practical application of the powertrain torsional processing algorithm of either of FIGS. 3 and 8 is shown in FIG. 9. FIG. 9 is a diagram of the mechanical link and angular relationship between the transmission 40 and differential 44 in the system 10 of FIG. 1, wherein the mechanical link includes the tailshaft 42 having one end operatively connected to the transmission 40 via one universal joint 45 (not shown in FIG. 1), and an opposite end operatively connected to the differential via another universal joint 46. In the illustrated embodiment, the transmission 40 and differential 44 are each mounted relative to the vehicle such that the transmission 40 is elevated in relationship to the differential 44. The tailshaft 42 defines a longitudinal axis 350 therethrough that bisects a substantially horizontal axis 352 defined through the differential 44 and passing through the universal joint 46. Axes 350 and 352 define an angle, θ, therebetween, wherein θ defines the angular relationship of the universal joint 46 relative to the tailshaft 42. Generally, θ is specified to be within a predefined range of angles, although certain maintenance and/or service activities relating to the drivetrain 57 may cause θ to fall outside of this predefined range. When this occurs, rotation of the tailshaft 42 may produce abnormally high amplitude $2^{nd}$-order torsionals under certain operating conditions. The powertrain torsional processing algorithm of either of FIGS. 3 and 8 allows for the diagnosis and/or control of such $2^{nd}$-order torsionals in this example, wherein the magnitudes of any $2^{nd}$-order torsionals required for the powertrain torsional processing algorithm may be determined as a function of the speed signal produced by the tailshaft speed sensor 64, and wherein the magnitude of the $2^{nd}$-order torsional component exceeding the threshold magnitude, TH1, for the first predefined duration, TP1, indicates that the angular relationship, θ, between the universal joint 46 and the tailshaft 42 is outside of the allowable angular range.

Figure 10:
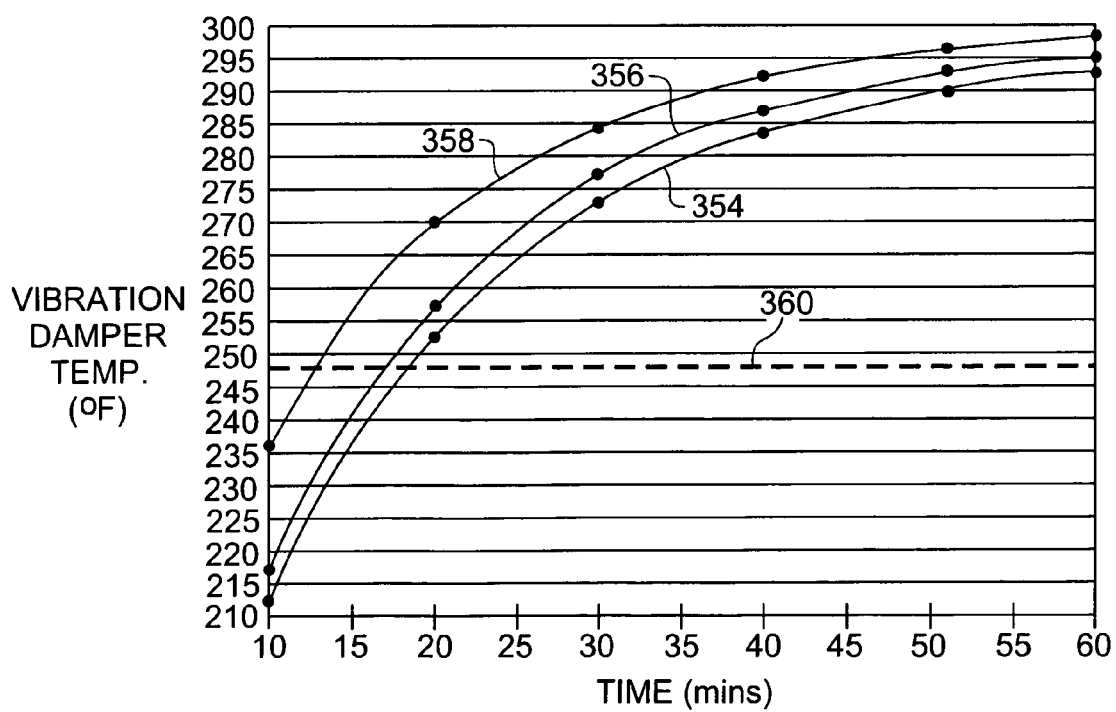
FIG. 10 is a plot of engine vibration damper operating temperature vs. time illustrating another practical application of the powertrain torsional processing algorithm of either of FIGS. 3 and 8.

Another specific example of a practical application of the powertrain torsional processing algorithm of either of FIGS. 3 and 8 is illustrated in FIG. 10, which is a plot of the operating temperature of the vibration damper 52 vs. time under constant operating conditions; e.g., steady state operation at 2500 RPM, for three different engine configurations 354, 356 and 358. A maximum vibration damper operating temperature limit 360 is superimposed on the plot, and in the illustrated example the maximum operating temperature is 248° F., and for each engine configuration 354, 356 and 358 the starting vibration operating temperature was between approximately 140° F. and 150° F. As illustrated in FIG. 10, the operating temperature of the vibration damper 52 for each of the three engine configurations 354, 356 and 358 exceeds the maximum operating temperature limit 360 sometime between 14 and 18 minutes of steady state operation at 2500 RPM. It has been determined that under the specified operating conditions for each of the three different engine configurations, the engine crankshaft 34 produce abnormally high amplitude $6^{th}$-order torsionals. The powertrain torsional processing algorithm of either of FIGS. 3 and 8 allows for the diagnosis and/or control of such $6^{th}$-order torsionals in this example, wherein the magnitudes of any $6^{th}$-order torsionals required for the powertrain torsional processing algorithm may be determined as a function of the speed signal produced by the engine speed sensor 50, and wherein the magnitude of the $6^{th}$-order torsional component exceeding the threshold magnitude, TH1, for the first predefined duration, TP1, while operating the engine within a predefined engine speed range results in an increase in an operating temperature of the vibration damper 52 above its safe operating temperature limit 360. The algorithm of FIGS. 3 or 8 thus provide for control of the operating temperature of the vibration damper 52 to maintain it below the maximum safe operating temperature limit 360.

While this disclosure has been illustrated and described in detail in the foregoing drawings and description, the same is to be considered as illustrative of the subject invention and not restrictive in character, it being understood that only illustrative embodiments thereof have been shown and described and that all changes and modifications that come within the spirit of the invention are desired to be protected. For example, while algorithms 100 and 300 have been illustrated and described as including time periods TP1 and TP2, such time periods are illustrative only of one technique for measuring or determining a "duration", wherein "duration" is defined for purposes of this document as the passage of a specified time period, the occurrence of a predefined number of crankshaft revolutions, the occurrence of a predefined number of torsionals having magnitude greater than the threshold magnitude, and/or any combination thereof. The "number" of torsionals may be fraction or real multiple of one full crankshaft revolution, and any such definition of "duration" is intended to fall within the scope of the claims appended hereto. Thus, steps 102 and 114 of algorithm 100, steps 190 and 192 of algorithm 118B and/or steps 302 and 310 of algorithm 300 may be replaced in one alternative embodiment by the steps of monitoring revolutions of the crankshaft 34, such as via an embodiment of the engine speed sensor 50 configured to produce an engine position signal indicative of a position of the crankshaft 34 relative to a reference position, and determining that a predefined duration has elapsed if the crankshaft 34 has rotated through a predefined number of revolutions. In another alternative embodiment, steps 102 and 114 of algorithm 100, steps 190 and 192 of algorithm 118B and/or steps 302 and 310 of algorithm 300 may be replaced by the steps of monitoring the magnitude of the Nth-order torsionals and determining that a predefined duration has elapsed if a predefined number of consecutive occurrences of the magnitude of the Nth-order torsional exceeding the threshold magnitude, TH1, has occurred. The term "duration" as used in the claims appended hereto is intended to encompass not only the time-based measurement technique illustrated in the figures, but also the foregoing engine position and torsional monitoring techniques as well as other definitions of "duration" that are time-based and/or based on one or more engine or system operating conditions.

As another example, it bears pointing out that while algorithms or routines 116A–116D are described herein as illustrating individual embodiments of the Nth-order torsional processing routine called by step 116 of algorithm 100 and by step 312 of algorithm 300, any Nth-order torsional processing operation carried out by the control computer 56 may alternatively include any combination of routines 116A–116D.

What is claimed is:

1. A system for processing vehicle powertrain torsional information, the system comprising:
   a vehicle powertrain having a plurality of powertrain components including an internal combustion engine and a number of downstream components driven by the engine;
   a speed sensor producing a speed signal indicative of rotational speed of one of the powertrain components; and
   a control computer determining a magnitude of an Nth-order torsional component of vehicle powertrain vibration as a function of the speed signal, the control computer executing either of a diagnostic routine relating to the Nth-order torsional component and a control routine controlling operation of the vehicle powertrain away from conditions at which the magnitude of the Nth-order torsional component exceeds a threshold magnitude if the magnitude of the Nth-order torsional component exceeds the threshold magnitude for at least a first predefined duration.

2. The system of claim 1 further including a fault lamp illuminating in response to a control signal;
   and wherein the control computer is operable under control of the diagnostic routine to produce the control signal to illuminate the fault lamp.

3. The system of claim 1 further including a memory unit;
   and wherein the control computer is operable under control of the diagnostic routine to log in the memory unit an elapsed time that the magnitude of the Nth-order torsional component exceeds the threshold magnitude.

4. The system of claim 1 wherein the control computer is configured to control output torque of the engine by controlling fuel supplied to the engine;
   and wherein the control computer is operable under control of the control routine to modify the output torque of the engine such that the resulting magnitude of the Nth-order torsional component is below the threshold magnitude.

5. The system of claim 4 wherein the control computer is further operable to delay for a second predefined duration after modifying the engine output torque and before determining the resulting magnitude of the Nth-order torsional component.

6. The system of claim 1 wherein the plurality of powertrain components includes a transmission operatively coupled to the engine and having a number of automatically selectable gears,
   and wherein the control computer is operable under control of the control routine to command an automatic transmission gear shift such that the resulting magnitude of the Nth-order torsional component is below the threshold magnitude.

7. The system of claim 6 wherein the control computer is further operable to delay for a second predefined duration after commanding the automatic transmission gear shift and before determining the resulting magnitude of the Nth-order torsional component.

8. The system of claim 1 wherein the speed sensor is an engine speed sensor producing the speed signal as a function of engine rotational speed.

9. The system of claim 1 wherein the engine includes a crankshaft rotatably driven by operation of the engine;
   and wherein the speed sensor is operatively coupled to one of the plurality of powertrain components.

10. The system of claim 9 wherein the plurality of powertrain components includes:
    a change gear transmission operatively coupled to the engine and driven by the crankshaft; and
    a tailshaft operatively coupled to, and driven by, the transmission;
    and wherein the speed sensor is a tailshaft speed sensor producing the speed signal indicative of rotational speed of the tailshaft.

11. The system of claim 1 wherein the control computer is an engine control computer configured to control and manage overall operation of the engine.

12. The system of claim 1 wherein the plurality of powertrain components includes a transmission operatively coupled to the engine and having a number of automatically selectable gears;
    and wherein the control computer is a transmission control computer configured to control and manage overall operation of the transmission.

13. The system of claim 12 further including:
    an engine control computer configured to control and manage overall operation of the engine; and
    a communication link between the transmission control computer and the engine control computer, the transmission control computer and the engine control computer communicating information therebetween via the communication link.

14. The system of claim 1 wherein the control computer includes a timer;
    and wherein the first predefined duration corresponds to an elapsed time value of the timer between a first occurrence of the magnitude of the Nth-order torsional component exceeding the threshold magnitude and a predefined elapsed time value.

15. The system of claim 8 wherein the engine speed sensor is further configured to produce an engine position signal indicative of a position of a crankshaft of the engine relative to a reference position;
    and wherein the first predefined duration corresponds to a predefined number of revolutions of the crankshaft of the engine, the control computer monitoring the engine position signal to determine the first predefined duration.

16. The system of claim 1 wherein the first predefined duration corresponds to a predefined number of consecutive occurrences of the magnitude of the Nth-order torsional component exceeding the threshold magnitude, the control computer monitoring the magnitude of the Nth-order torsional component to determine the first predefined duration.

17. The system of claim 1 further including a vibration damper coupled to a crankshaft of the engine, the vibration damper operable to damp vibrations resulting from rotation of the crankshaft;
    wherein the Nth-order torsional component corresponds to a $6^{th}$-order torsional component, the magnitude of the $6^{th}$-order torsional component exceeding the threshold magnitude for the first predefined duration while operating the engine within a predefined engine speed range resulting in an increase in an operating temperature of the vibration temperature above a safe operating temperature limit.

18. The system of claim 1 wherein the plurality of powertrain components includes:
    a change gear transmission operatively coupled to the engine;
    a tailshaft having a first end operatively coupled to the transmission and an opposite second end;
    a differential having a universal joint operatively connected to the second end of the tailshaft, the connection between the universal joint and the tailshaft defining an angular relationship therebetween having an allowable angular range;
    wherein the Nth-order torsional component corresponds to a $2^{nd}$-order torsional component, the magnitude of the $2^{nd}$-order torsional component exceeding the threshold magnitude for the first predefined duration indicating that the angular relationship between the universal joint and the tailshaft is outside of the allowable angular range.

19. A method of processing torsional information relating to operation of a vehicle powertrain having a plurality of powertrain components including an internal combustion engine and a number of downstream components driven by the engine, and having a speed sensor producing a speed signal indicative of rotational speed of one of the powertrain components, the method comprising the steps of:
    processing the speed signal to determine a magnitude of an Nth-order torsional component of vehicle powertrain vibration; and
    executing either of a diagnostic routine relating to the Nth-order torsional component and a control routine controlling operation of the vehicle powertrain away from conditions at which the magnitude of the Nth-order torsional component exceeds a threshold magnitude if the magnitude of the Nth-order torsional component exceeds the threshold magnitude for at least a predefined duration.

20. The method of claim 19 wherein the diagnostic routine of the executing step includes illuminating a fault lamp under control of the diagnostic routine.

21. The method of claim 19 wherein the diagnostic routine of the executing step includes logging in memory an elapsed time that the magnitude of the Nth-order torsional component exceeds the threshold magnitude.

22. The method of claim 19 wherein the control routine of the executing step includes modifying engine output torque such that the resulting magnitude of the Nth-order torsional component is below the threshold magnitude.

23. The method of claim 19 wherein the control routine of the executing step includes commanding an automatic gear shift of a transmission operatively coupled to the engine such that the resulting magnitude of the Nth-order torsional component is below the threshold magnitude.

24. A system for processing vehicle powertrain torsional information, the system comprising:
    a vehicle powertrain having a plurality of powertrain components including an internal combustion engine and a number of downstream components driven by the engine;
    a speed sensor producing a speed signal indicative of rotational speed of one of the powertrain components; and
    a control computer configured to control engine fueling and to determine an engine load value as a function of the engine fueling, the control computer determining whether the engine speed signal and engine load value are within a speed-load region in which a magnitude of an Nth-order torsional component of vehicle powertrain vibration exceeds a threshold magnitude, and executing either of a diagnostic routine relating to the Nth-order torsional component and a control routine controlling operation of the vehicle powertrain away from the speed-load region if the engine speed signal and engine load value are within the speed-load region for at least a predefined duration.

25. The system of claim 24 further including a fault lamp illuminating in response to a control signal;
    and wherein the control computer is operable under control of the diagnostic routine to produce the control signal to illuminate the fault lamp.

26. The system of claim 24 further including a memory unit;
    and wherein the control computer is operable under control of the diagnostic routine to log in the memory unit an elapsed time that the engine speed signal and engine load value are within the speed-load region.

27. The system of claim 24 wherein the control computer is configured to control output torque of the engine;
    and wherein the control computer is operable under control of the control routine to modify the output torque of the engine to move engine operating conditions away from of the speed-load region.

28. The system of claim 24 wherein the plurality of powertrain components includes a transmission operatively coupled to the engine and having a number of automatically selectable gears,
    and wherein the control computer is operable under control of the control routine to command an automatic transmission gear shift to move engine operating conditions away from of the speed-load region.

* * * * *